United States Patent
Daito et al.

(10) Patent No.: US 11,261,303 B2
(45) Date of Patent: Mar. 1, 2022

(54) POLYIMIDE RESIN FILM AND METHOD FOR PRODUCING POLYIMIDE RESIN FILM

(71) Applicant: MITSUBISHI GAS CHEMICAL COMPANY, INC., Tokyo (JP)

(72) Inventors: Aoi Daito, Kanagawa (JP); Shinji Sekiguchi, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 16/318,899

(22) PCT Filed: Jul. 19, 2017

(86) PCT No.: PCT/JP2017/026105
§ 371 (c)(1),
(2) Date: Jan. 18, 2019

(87) PCT Pub. No.: WO2018/016526
PCT Pub. Date: Jan. 25, 2018

(65) Prior Publication Data
US 2019/0185631 A1 Jun. 20, 2019

(30) Foreign Application Priority Data
Jul. 21, 2016 (JP) .............................. JP2016-143449

(51) Int. Cl.
| C08J 5/18 | (2006.01) |
| B05D 3/02 | (2006.01) |
| C08K 5/13 | (2006.01) |
| C08L 79/08 | (2006.01) |
| G02B 1/10 | (2015.01) |
| C08G 73/10 | (2006.01) |
| C08K 5/37 | (2006.01) |
| C08K 5/524 | (2006.01) |

(52) U.S. Cl.
CPC .............. C08J 5/18 (2013.01); B05D 3/0254 (2013.01); C08G 73/1042 (2013.01); C08G 73/1046 (2013.01); C08G 73/1078 (2013.01); C08K 5/13 (2013.01); C08L 79/08 (2013.01); G02B 1/10 (2013.01); B05D 2505/50 (2013.01); C08J 2379/08 (2013.01); C08K 5/37 (2013.01); C08K 5/524 (2013.01); C08L 2203/16 (2013.01)

(58) Field of Classification Search
CPC . C08J 5/18; C08J 79/08; C08J 2203/16; C08J 2379/08; C08G 73/1042; C08G 73/1078; C08G 73/1046; G02B 1/10; C08K 5/13; C08K 5/524; C08K 5/37; C08K 5/005; B05D 2505/50; B05D 3/0254
See application file for complete search history.

(56) References Cited

U.S. PATENT DOCUMENTS

| 2006/0199920 A1 | 9/2006 | Okada et al. | |
| 2010/0187719 A1* | 7/2010 | Oishi ................ | C08G 73/1078 264/216 |
| 2011/0291260 A1 | 12/2011 | Kazutaka et al. | |
| 2014/0322444 A1 | 10/2014 | Suenaga et al. | |
| 2015/0027754 A1 | 1/2015 | Shimoda et al. | |
| 2016/0177062 A1 | 6/2016 | Sato et al. | |

FOREIGN PATENT DOCUMENTS

| JP | 2004-325980 | | 11/2004 | |
| JP | 2006-219612 | | 8/2006 | |
| JP | 2010-009052 | | 1/2010 | |
| JP | 2010-077382 | | 4/2010 | |
| JP | 2010-077382 A * | 4/2010 | |
| JP | 2010077382 A * | 4/2010 | |
| JP | 2010097188 A * | 4/2010 | |
| JP | 4716149 B2 * | 7/2011 | ......... C08G 18/7671 |
| JP | 2012-194537 | | 10/2012 | |
| JP | 2012-194537 A * | 10/2012 | |
| JP | 2012-194538 | | 10/2012 | |
| JP | 2012-194538 A * | 10/2012 | |
| JP | 2012194537 A * | 10/2012 | |
| JP | 2012194538 A * | 10/2012 | |
| JP | 2013-107934 | | 6/2013 | |
| JP | 2013-127597 | | 6/2013 | |
| JP | 2013-127597 A * | 6/2013 | |
| JP | 2013127597 A * | 6/2013 | |
| JP | 5589384 | | 8/2014 | |
| JP | 2015-74660 | | 4/2015 | |
| JP | 2016064642 A * | 4/2016 | |
| WO | 2008/146637 | | 12/2008 | |
| WO | 2013/108890 | | 7/2013 | |
| WO | 2015/020020 | | 2/2015 | |
| WO | 2015-125469 | | 8/2015 | |
| WO | WO-2016111130 A1 * | 7/2016 | ............. C08G 73/14 |
| WO | 2016/190105 | | 12/2016 | |

OTHER PUBLICATIONS

Official Communication issued in International Bureau of WIPO Patent Application No. PCT/JP2017/026105, dated Oct. 24, 2017.
Office Action issued in European Patent Office (EPO) Counterpart Patent Appl. No. 17831042.1, dated May 20, 2020.

* cited by examiner

*Primary Examiner* — William P Fletcher, III
(74) *Attorney, Agent, or Firm* — Greenblum & Bernstein, P.L.C.

(57) ABSTRACT

A method for producing a polyimide resin film, including: a coating step of forming a coated film by coating a polyimide resin composition containing a polyimide resin, an antioxidant, and a solvent on a substrate; and a drying step of drying the coated film in air at 180° C. or more, the antioxidant being a phenol-based antioxidant, and a content of the phenol-based antioxidant being 0.05 part by mass or more per 100 parts by mass of the polyimide resin.

6 Claims, No Drawings

POLYIMIDE RESIN FILM AND METHOD FOR PRODUCING POLYIMIDE RESIN FILM

TECHNICAL FIELD

The present invention relates to a polyimide resin film and a method for producing a polyimide resin film.

BACKGROUND ART

A polyimide resin has excellent characteristics in mechanical characteristics, chemical resistance, electric characteristics, and the like, in addition to the high heat resistance thereof. Owing to the characteristics, a film formed of a polyimide resin as a material thereof has been widely used in the fields including a molding material, a composite material, an electric or electronic component, a display device, and the like.

Associated with the advent of the advanced information society in recent years, a film that is low in yellow index (YI) and haze and also has good transparency, in addition to the aforementioned characteristics, is demanded in the field of optical communication, such as an optical fiber and an optical waveguide, and the field of a display device, such as a liquid crystal orientation film and a color filter.

For example, a polyimide resin film that is produced by using cyclohexanetetracarboxylic dianhydride as a tetracarboxylic acid dianhydride, which is a raw material of a polyimide resin, has good transparency. However, the film necessitates a nitrogen atmosphere in drying the film, which is said to be one of the factors increasing the production cost of the film. Accordingly, the use of an air environment as the atmosphere in the production of the film is significant for the cost reduction.

For example, PTL 1 proposes a method for producing a colorless transparent resin film that has high colorless transparency and is excellent in heat resistance and flatness, and an apparatus for producing the resin film.

CITATION LIST

Patent Literature

PTL 1: JP 5,589,384 B

SUMMARY OF INVENTION

Technical Problem

The production method described in PTL 1 is significant in the point that a complete nitrogen atmosphere is not necessary, but requires plural process steps, making somewhat complicated points, and may be demanded for providing a higher productivity in some cases.

Under the circumstances, an object of the present invention is to provide a method for producing a polyimide resin film that is capable of producing a polyimide resin film having low YI and high transparency, with high productivity at low cost. Another object thereof is to provide a polyimide resin film having low YI and high transparency.

Solution to Problem

The present inventors have found that the aforementioned objects can be achieved in such a manner that a polyimide resin is mixed with a phenol-based antioxidant to form a polyimide resin composition, and a coated film formed with the composition is subjected to a prescribed drying treatment in air, and thus the present invention has been completed.

The present invention relates to the following items [1] to [6].

[1] A method for producing a polyimide resin film, including: a coating step of forming a coated film by coating a polyimide resin composition containing a polyimide resin, an antioxidant, and a solvent on a substrate; and a drying step of drying the coated film in air at 180° C. or more, the antioxidant being a phenol-based antioxidant, and a content of the phenol-based antioxidant being 0.05 part by mass or more per 100 parts by mass of the polyimide resin.

[2] The method for producing a polyimide resin film according to the item [1], including, between the coating step and the drying step, a primarily dried film producing step of providing a primarily dried film by heating the coated film at a heating temperature of 50 to 110° C. for a heating period of 30 to 90 minutes.

[3] The method for producing a polyimide resin film according to the item [1] or [2], wherein the solvent is at least one selected from the group consisting of N,N-dimethylacetamide and γ-butyrolactone.

[4] The method for producing a polyimide resin film according to any one of the items [1] to [3], wherein the polyimide resin composition contains a sulfur-based antioxidant and/or a phosphorus-based antioxidant, and a total content of the sulfur-based antioxidant and/or the phosphorus-based antioxidant is 10 parts by mass or less per 100 parts by mass of the polyimide resin.

[5] A polyimide resin film, which is composed of a dried product of a polyimide resin composition containing a polyimide resin and a phenol-based antioxidant and has a residual solvent amount of 3.0% by mass or less.

[6] The polyimide resin film according to the item [5], wherein a content of the phenol-based antioxidant in the polyimide resin composition is 0.05 part by mass or more per 100 parts by mass of the polyimide resin.

Advantageous Effects of Invention

According to the present invention, a method for producing a polyimide resin film that is capable of producing a polyimide resin film having low YI and high transparency, with high productivity at low cost can be provided. Furthermore, a polyimide resin film having low YI and high transparency can also be provided.

DESCRIPTION OF EMBODIMENTS

[Method for Producing Polyimide Resin Film]

The method for producing a polyimide resin film of the present invention includes the particular coating step and the particular drying step. The steps will be described in detail below.

(Coating Step)

In the coating step, a coated film is formed by coating a polyimide resin composition containing a polyimide resin, an antioxidant, and a solvent on a substrate.

The production method of the polyimide resin composition is not particularly limited, and for example, a diamine component for constituting the polyimide resin is dissolved in a solvent along with an imidization catalyst, so as to provide a diamine solution. The diamine solution is mixed with a tetracarboxylic acid dianhydride for constituting the polyimide resin and a solvent therefor. Thereafter, the solution is heated to a prescribed temperature to provide a polyimide resin solution. The polyimide resin solution is mixed with the antioxidant to provide the polyimide resin composition.

The method for subjecting the tetracarboxylic acid dianhydride component and the diamine component described above to imidization reaction is not particularly limited, and a known method can be used.

Specific examples of the reaction method include (1) a method, in which the diamine component and the reaction solvent are charged and dissolved in a reactor, then the tetracarboxylic acid dianhydride component is charged therein, the mixture is stirred at room temperature to 80° C. for 0.5 to 30 hours depending on necessity, and then the temperature is increased to perform the imidization reaction, (2) a method, in which the tetracarboxylic acid dianhydride component, the diamine component, and the reaction solvent are charged in a reactor, and stirred at room temperature to 80° C. for 0.5 to 30 hours, and then the temperature is increased to perform the imidization reaction, and (3) a method, in which the tetracarboxylic acid dianhydride component, the diamine component, and the reaction solvent are charged in a reactor, and immediately the temperature is increased to perform the imidization reaction.

In the case where the imidization catalyst is used, the temperature of the imidization reaction is preferably from 120 to 250° C., and more preferably from 160 to 200° C., from the standpoint of the reaction rate, the suppression of gelation, and the like. The reaction time is preferably from 0.5 to 10 hours from the start of distillation of produced water.

The temperature of the imidization reaction in the case where the imidization catalyst is not used is preferably from 200 to 350° C.

The imidization reaction is preferably performed while water formed in the production is removed with a Dean-Stark apparatus or the like. The operation may increase the polymerization degree and the imidization rate.

In the present invention, a phenol-based antioxidant is used as the antioxidant. The use of a phenol-based antioxidant may enable a drying treatment in air described later, and a polyimide resin film having low YI and high transparency can be consequently obtained.

As described above, for providing a polyimide resin film having low YI and high transparency, the drying step has been ordinarily performed in a nitrogen atmosphere for preventing the oxidation of the polyimide resin in the production process of the film.

Although the drying step performed in air has been demanded from the standpoint of the enhancement of the productivity and the reduction of the cost, a polyimide resin tends to be oxidized in drying in air at a high temperature, and as a result, the YI of the polyimide resin film tends to increase, and the transparency thereof tends to decrease. In the case where an antioxidant is added to prevent the oxidation of the polyimide resin, on the other hand, the oxidation of the polyimide resin can be suppressed, but there is a concern about increase of the YI of the film and decrease of the transparency thereof, which are caused by the presence of the antioxidant itself. Accordingly, it has been considered that it is difficult to perform the drying step in air in the production method of a polyimide resin film.

However, the present inventors have surprisingly found that a phenol-based antioxidant among the antioxidants can sufficiently suppress the oxidation of the polyimide resin, and simultaneously can significantly decrease the coloration of the film and the decrease of the transparency thereof which are caused by the presence of the antioxidant itself.

The phenol-based antioxidant referred herein means an antioxidant having a phenol structure at an end thereof, and an antioxidant having a phenol structure represented by the following formula (A) is preferred.

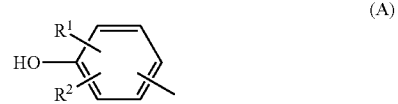

(A)

In the formula, $R^1$ and $R^2$ each independently represent an alkyl group having 4 or less carbon atoms.

An antioxidant having a phenol structure represented by the following formula (A-1) at an end thereof is more preferred from the standpoint of the decrease of the YI.

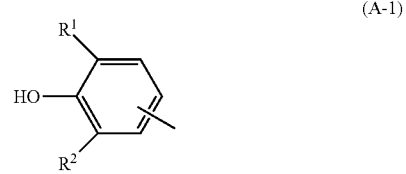

(A-1)

In the formula, $R^1$ and $R^2$ each independently represent an alkyl group having 4 or less carbon atoms.

In the formulae (A) and (A-1), the alkyl groups represented by $R^1$ and $R^2$ each independently are preferably a methyl group or a t-butyl group.

In consideration of the heating stability in air, the phenol-based antioxidant preferably has a molecular weight of 600 or more, and more preferably 650 or more.

Examples of the commercially available product of the phenol-based antioxidant include 2,6-bis(1,1-dimethylethyl)-4-methylphenol, 2-tert-butyl-6-(3-tert-butyl-2-hydroxybenzyl)-4-methylphenyl acrylate (Sumilizer (registered trade mark) GM), 2-[1-(2-hydroxy-3,5-di-tert-pentylphenyl)ethyl]-4,6-di-tert-pentylphenyl acrylate (Sumilizer (registered trade mark) GS(F)), 6-[3-(3-tert-butyl-4-hydroxy-5-methylphenyl)propoxy]-2,4,8,10-tetra-tert-butyl-di benzo[d,f][1,3,2]dioxaphosphepine (Sumilizer (registered trade mark) GP), 3,9-bis[2-[3-(3-tert-butyl-4-hydroxy-5-methylphenyl)propionyloxy]-1,1-dimethylethyl]-2,4,8,10-tetraoxaspiro[5.5]undecane (Sumilizer (registered trade mark) GA-80), and 4,4'-thiobis(6-tert-butyl-3-methylphenol) (Sumilizer (registered trade mark) WX-R) (all produced by Sumitomo Chemical Co., Ltd.); Adeka Stab AO-20, Adeka Stab AO-30, Adeka Stab AO-40, Adeka Stab AO-50, Adeka Stab AO-60, Adeka Stab AO-80, and Adeka Stab AO-330 (all produced by Adeka Corporation); Irganox (registered trade mark) 1010, ditto 1035, ditto 1076, ditto 1098, ditto 1135, ditto 1330, ditto 1726, ditto 1425WL, ditto 1520L, ditto 245, ditto 259, ditto 3114, ditto 565, and ditto 295 (all produced by BASF AG); and Songnox (registered trade mark) 1010 (produced by Songwon Industrial Co., Ltd.).

Preferred specific examples of the phenol-based antioxidant include the following compounds (A1), (A2), and (A3).

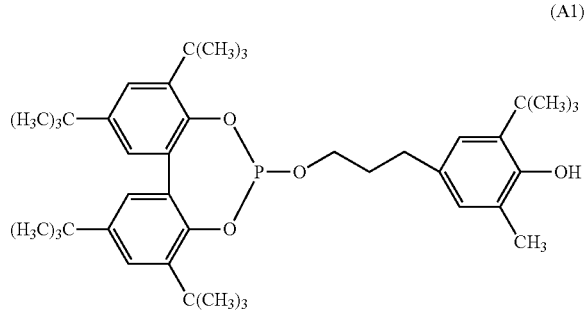

(A1)

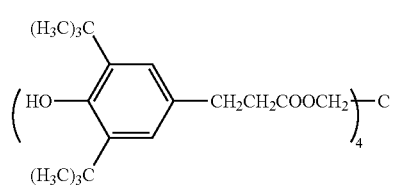

(A2)

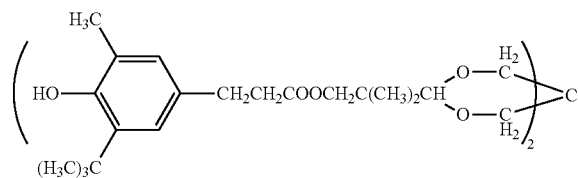

(A3)

The compound (A1) is 6-[3-(3-tert-butyl-4-hydroxy-5-methylphenyl)propoxy]-2,4,8,10-tetra-tert-butyl-di benzo[d,f][1,3,2]dioxaphosphepine, and is available as Sumilizer GP, produced by Sumitomo Chemical Co., Ltd.

The compound (A2) is pentaerythritol tetrakis[3-(3,5-di-tert-butyl-4-hydroxyphenyl)propionate], and is available as Adeka Stab AO-60, produced by Adeka Corporation, Songnox 1010, produced by Songwon Industrial Co., Ltd., or Irganox 1010, produced by BASF AG.

The compound (A3) is 3,9-bis[2-[3-(3-tert-butyl-4-hydroxy-5-methylphenyl)propionyloxy]-1,1-dimethylethyl]-2,4,8,10-tetraoxaspiro[5.5]undecane, and is available as Sumilizer GA-80, produced by Sumitomo Chemical Co., Ltd., or Adeka Stab AO-80, produced by Adeka Corporation.

In the polyimide resin composition, the content of the phenol-based antioxidant is 0.05 part by mass or more, preferably from 0.05 to 10 parts by mass, more preferably from 0.1 to 3 parts by mass, and further preferably from 0.1 to 1 part by mass, per 100 parts by mass of the polyimide resin. In the case where the content of the phenol-based antioxidant is less than 0.05 part by mass, the polyimide resin film finally obtained has high YI. The content of the phenol-based antioxidant is preferably 10 parts by mass or less from the standpoint of the suppression of the decrease of the transparency of the film caused by the presence of the antioxidant itself.

The polyimide resin is preferably a polyimide resin having a structural unit represented by the following general formula (I) from the standpoint of the production of a polyimide resin film having low YI and high transparency:

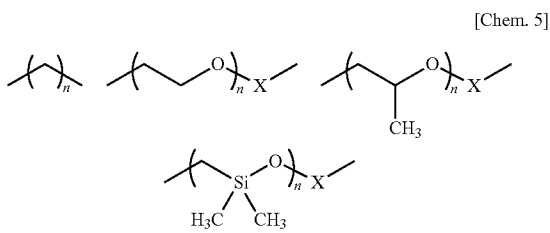

(I)

In the formula, Rx represents an tetravalent aliphatic hydrocarbon group or alicyclic hydrocarbon group having 4 to 39 carbon atoms; and Ry represents a group formed of a divalent aliphatic hydrocarbon group having 1 to 39 carbon atoms, a divalent alicyclic hydrocarbon group having 4 to 39 carbon atoms, a divalent aromatic hydrocarbon group having 6 to 39 carbon atoms, or a group containing a combination of these groups, which may contain at least one group selected from the group consisting of —O—, —$SO_2$—, —CO—, —$CH_2$—, —$C(CH_3)_2$—, —$OSi(CH_3)_2$—, —$C_2H_4O$—, and —S—, as a linking group.

Examples of the tetravalent aliphatic hydrocarbon group having 4 to 39 carbon atoms represented by Rx include a butan-1,1,4,4-tetrayl group, an octan-1,1,8,8-tetrayl group, and a decan-1,1,10,10-tetrayl group.

Examples of the tetravalent alicyclic hydrocarbon group having 4 to 39 carbon atoms represented by Rx include a cyclobutan-1,2,3,4-tetrayl group, a cyclopentan-1,2,4,5-tetrayl group, a cyclohexan-1,2,4,5-tetrayl group, a bicyclo[2.2.2]oct-7-en-2,3,5,6-tetrayl group, a bicyclo[2.2.2]octan-2,3,5,6-tetrayl group, a 3,3',4,4'-dicyclohexyltetrayl group, a 3,6-dimethylcyclohexan-1,2,4,5-tetrayl group, and a 3,6-diphenylcyclohexan-1,2,4,5-tetrayl group.

Examples of the divalent aliphatic hydrocarbon group having 1 to 39 carbon atoms, which has or does not have the linking group, represented by Ry include groups represented by the following structural formulae.

[Chem. 5]

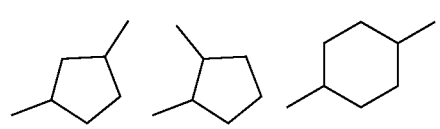

In the structural formulae, n represents the number of the structural unit, which is preferably from 1 to 5, and more preferably from 1 to 3; and X represents an alkanediyl group having 1 to 3 carbon atoms, i.e., a methylene group, an ethylene group, a trimethylene group, or a propan-1,2-diyl group, and preferably a methylene group.

Examples of the divalent alicyclic hydrocarbon group having 4 to 39 carbon atoms, which has or does not have the linking group, represented by Ry include groups represented by the following structural formulae.

[Chem. 6]

-continued

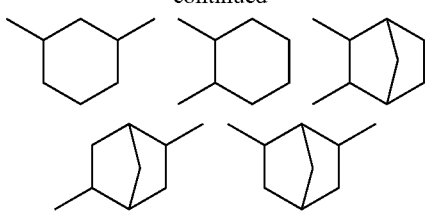

Examples of the divalent aromatic hydrocarbon group having 6 to 39 carbon atoms, which has or does not have the linking group, represented by Ry include groups represented by the following structural formulae.

[Chem. 7]

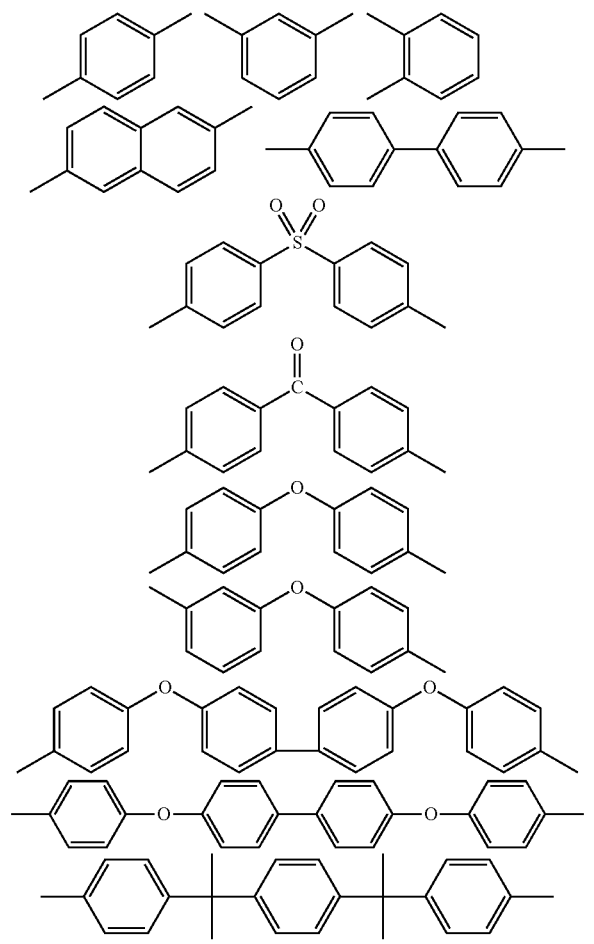

Examples of the group containing a combination of the aliphatic hydrocarbon group, the alicyclic hydrocarbon group, and the aromatic hydrocarbon group include groups represented by the following structural formulae.

[Chem. 8]

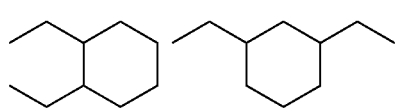

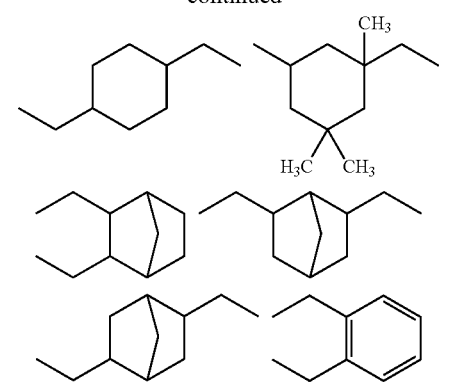

-continued

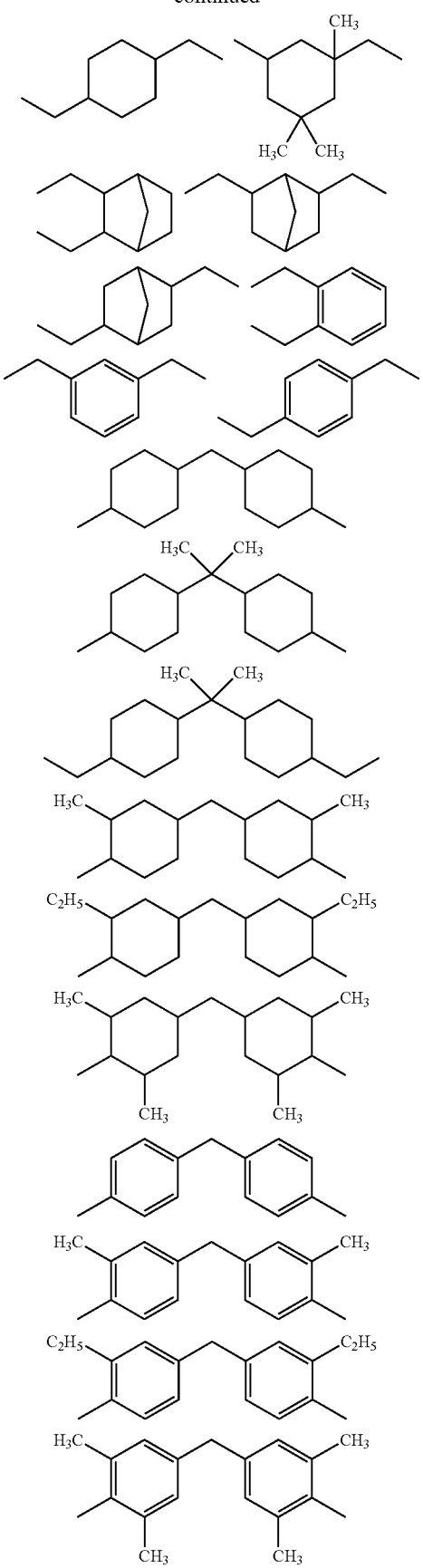

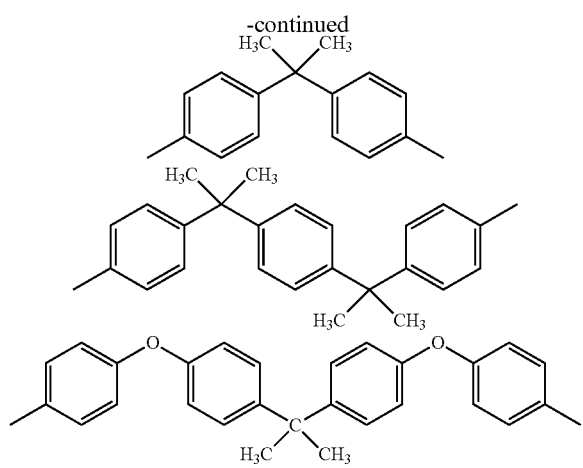

Ry preferably represents a divalent aromatic hydrocarbon group having 6 to 39 carbon atoms having the linking group or a combination of the aromatic hydrocarbon group and an aliphatic hydrocarbon group, and particularly preferably groups represented by the following structural formulae.

[Chem. 9]

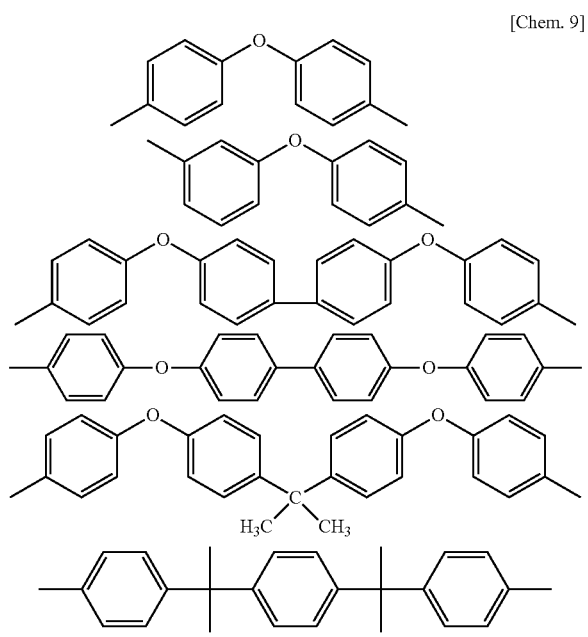

The structural unit represented by the general formula (I) is preferably from 10 to 100% by mol, more preferably from 50 to 100% by mol, further preferably from 80 to 100% by mol, and particularly preferably from 90 to 100% by mol, based on the total structural units. The number of the structural unit represented by the general formula (I) in one molecule of the polyimide resin may be from 10 to 2,000, and is preferably from 20 to 200, and as far as in this range, the glass transition temperature is preferably from 230 to 350° C., and more preferably from 250 to 330° C.

The polyimide resin can be obtained through reaction of an aliphatic or alicyclic tetracarboxylic acid or a derivative thereof and a diamine or a derivative thereof.

Examples of the aliphatic or alicyclic tetracarboxylic acid or a derivative thereof include an aliphatic or alicyclic tetracarboxylic acid, an aliphatic or alicyclic tetracarboxylate ester compound, and an aliphatic or alicyclic tetracarboxylic acid dianhydride. In the aliphatic or alicyclic tetracarboxylic acid or a derivative thereof, an alicyclic tetracarboxylic acid dianhydride is preferred.

Examples of the derivative of the diamine include a diisocyanate and a diaminodisilane compound. In the diamine or a derivative thereof, a diamine is preferred.

Examples of the aliphatic tetracarboxylic acid include 1,2,3,4-butanetetracarboxylic acid. Examples of the alicyclic tetracarboxylic acid include 1,2,3,4-cyclobutanetetracarboxylic acid, 1,2,4,5-cyclopentanetetracarboxylic acid, 1,2,4,5-cyclohexanetetracarboxylic acid, bicyclo[2.2.2]oct-7-ene-2,3,5,6-tetracarboxylic acid, and bicyclo[2.2.2]octane-2,3,5,6-tetracarboxylic acid.

Examples of the aliphatic tetracarboxylate ester compound include a monoalkyl ester, a dialkyl ester, a trialkyl ester, and a tetraalkyl ester of the aforementioned aliphatic tetracarboxylic acids. Examples of the alicyclic tetracarboxylate ester compound include a monoalkyl ester, a dialkyl ester, a trialkyl ester, and a tetraalkyl ester of the aforementioned alicyclic tetracarboxylic acids. The alkyl group moiety is preferably an alkyl group having 1 to 5 carbon atoms, and more preferably an alkyl group having 1 to 3 carbon atoms.

Examples of the aliphatic tetracarboxylic acid dianhydride include 1,2,3,4-butanetetracarboxylic dianhydride. Examples of the alicyclic tetracarboxylic acid dianhydride include 1,2,3,4-cyclobutanetetracarboxylic dianhydride, 1,2,4,5-cyclopentanetetracarboxylic dianhydride, 1,2,4,5-cyclohexanetetracarboxylic dianhydride, bicyclo[2.2.2]oct-7-ene-2,3,5,6-tetracarboxylic dianhydride, and bicyclo[2.2.2]octane-2,3,5,6-tetracarboxylic dianhydride. What is particularly preferred is 1,2,4,5-cyclohexanetetracarboxylic dianhydride. In general, a polyimide resin having an aliphatic diamine as a constitutional component thereof forms a strong salt with the polyamide acid as an intermediate product and the diamine, and therefore a solvent having a relatively high solubility of the salt (such as cresol, N,N-dimethylacetamide, γ-butyrolactone, and N-methyl-2-pyrrolidone) is preferably used for increasing the molecular weight thereof. However, even in the polyimide resin having an aliphatic diamine as a constitutional component, in the case where 1,2,4,5-cyclohexanetetracarboxylic dianhydride is used as the constitutional component, the polyamide acid and the diamine forming the salt are bonded through a relatively weak bond, and therefore increasing molecular weight can be easily obtained to facilitate the production of a flexible film.

The aliphatic or alicyclic tetracarboxylic acid or a derivative thereof may be used alone or as a combination of two or more kinds thereof. An additional tetracarboxylic acid or a derivative (particularly a dianhydride) thereof may be used in combination in such a range that does not impair the solvent solubility of the polyimide resin, and the flexibility, the thermocompression bonding property, and the transparency of the film.

Examples of the additional tetracarboxylic acid or a derivative thereof include an aromatic tetracarboxylic acid, such as pyromellitic acid, 3,3',4,4'-biphenyltetracarboxylic acid, 2,3,3',4'-biphenyltetracarboxylic acid, 2,2-bis(3,4-dicarboxyphenyl)propane, 2,2-bis(2,3-dicarboxyphenyl)propane, 2,2-bis(3,4-dicarboxyphenyl)-1,1,1,3,3,3-hexafluoropropane, 2,2-bis(2,3-dicarboxyphenyl)-1,1,1,3,3,3-hexafluoropropane, bis(3,4-dicarboxyphenyl) sulfone, bis(3,4-dicarboxyphenyl) ether, bis(2,3-dicarboxyphenyl) ether, 3,3',4,4'-benzophenonetetracarboxylic acid, 2,2',3,3'-benzophenonetetracarboxylic acid, 4,4-(p-phenylenedioxy)diphthalic acid, 4,4-(m-phenylenedioxy)diphthalic acid, 1,1-bis(2,3-dicarboxyphenyl)ethane, bis(2,3-dicarboxyphenyl)methane, and bis(3,4-dicarboxyphenyl)methane, and a derivative (particularly a dianhydride) thereof; and an aliphatic tetracarboxylic acid having 1 to 3 carbon atoms, such as ethylenetetracarboxylic acid, and a derivative (particularly a dianhydride) thereof.

The diamine may be any of an aromatic diamine, an aliphatic diamine, and a mixture thereof. In the present invention, the "aromatic diamine" means a diamine having an amino group that is bonded directly to an aromatic ring, and may contain an aliphatic hydrocarbon group, an alicyclic hydrocarbon group, and other substituents (such as a halogen atom, a sulfonyl group, a carbonyl group, and an oxygen atom), as a part of the structure thereof. The "aliphatic diamine" means a diamine having an amino group that is bonded directly to an aliphatic hydrocarbon group or an alicyclic hydrocarbon group, and may contain an aromatic hydrocarbon group and other substituents (such as a halogen atom, a sulfonyl group, a carbonyl group, and an oxygen atom), as a part of the structure thereof.

Examples of the aromatic diamine include p-phenylenediamine, m-phenylenediamine, 2,4-diaminotoluene, 2,6-diaminotoluene, benzidine, o-tolidine, m-tolidine, bis(trifluoromethyl)benzidine, octafluorobenzidine, 3,3'-dihydroxy-4,4'-diaminobiphenyl, 3,3'-dimethoxy-4,4'-diaminobiphenyl, 3,3'-dichloro-4,4'-diaminobiphenyl, 3,3'-difluoro-4,4'-diaminobiphenyl, 2,6-diaminonaphthalene, 1,5-diaminonaphthalene, 4,4'-diaminodiphenyl ether, 3,4'-diaminodiphenyl ether, 4,4'-diaminodiphenylmethane, 4,4'-diaminodiphenyl sulfone, 3,4'-diaminodiphenyl sulfone, 4,4'-diaminobenzophenone, 2,2-bis(4-(4-aminophenoxy)phenyl)propane, 2,2-bis(4-(2-methyl-4-aminophenoxy)phenyl)propane, 2,2-bis(4-(2,6-dimethyl-4-aminophenoxy)phenyl)propane, 2,2-bis(4-(4-aminophenoxy)phenyl)hexafluoropropane, 2,2-bis(4-(2-methyl-4-aminophenoxy)phenyl)hexafluoropropane, 2,2-bis(4-(2,6-dimethyl-4-aminophenoxy)phenyl)hexafluoropropane, 4,4'-bis(4-aminophenoxy)biphenyl, 4,4'-bis(2-methyl-4-aminophenoxy)biphenyl, 4,4'-bis(2,6-dimethyl-4-aminophenoxy)biphenyl, 4,4'-bis(3-aminophenoxy)biphenyl, bis(4-(4-aminophenoxy)phenyl) sulfone, bis(4-(2-methyl-4-aminophenoxy)phenyl) sulfone, bis(4-(2,6-dimethyl-4-aminophenoxy)phenyl) sulfone, bis(4-(4-aminophenoxy)phenyl) ether, bis(4-(2-methyl-4-aminophenoxy)phenyl) ether, bis(4-(2,6-dimethyl-4-aminophenoxy)phenyl) ether, 1,4-bis(4-aminophenoxy)benzene, 1,4-bis(2-methyl-4-aminophenoxy)benzene, 1,4-bis(2,6-dimethyl-4-aminophenoxy)benzene, 1,3-bis(4-aminophenoxy)benzene, 1,3-bis(2-methyl-4-aminophenoxy)benzene, 1,3-bis(2,6-dimethyl-4-aminophenoxy)benzene, 1,4-bis(4-amino-α,α-dimethylbenzyl)benzene, 2,2-bis(4-aminophenyl)propane, 2,2-bis(2-methyl-4-aminophenyl)propane, 2,2-bis(3-methyl-4-aminophenyl)propane, 2,2-bis(3-ethyl-4-aminophenyl)propane, 2,2-bis(3,5-dimethyl-4-aminophenyl)propane, 2,2-bis(2,6-dimethyl-4-aminophenyl)propane, 2,2-bis(4-aminophenyl)hexafluoropropane, 2,2-bis(2-methyl-4-aminophenyl)hexafluoropropane, 2,2-bis(2,6-dimethyl-4-aminophenyl)hexafluoropropane, α,α'-bis(4-aminophenyl)-1,4-diisopropylbenzene, α,α'-bis(2-methyl-4-aminophenyl)-1,4-diisopropylbenzene, α,α'-bis(2,6-dimethyl-4-aminophenyl)-1,4-diisopropylbenzene, α,α'-bis(3-aminophenyl)-1,4-diisopropylbenzene, α,α'-bis(4-aminophenyl)-1,3-diisopropylbenzene, α,α'-bis(2-methyl-4-aminophenyl)-1,3-diisopropylbenzene, α,α'-bis(2,6-dimethyl-4-aminophenyl)-1,3-diisopropylbenzene, α,α'-bis(3-aminophenyl)-1,3-diisopropylbenzene, 9,9-bis(4-aminophenyl)fluorene, 9,9-bis(2-methyl-4-aminophenyl)fluorene, 9,9-bis(2,6-dimethyl-4-aminophenyl)fluorene, 1,1-bis(4-aminophenyl)cyclopentane, 1,1-bis(2-methyl-4-aminophenyl)cyclopentane, 1,1-bis(2,6-dimethyl-4-aminophenyl)cyclopentane, 1,1-bis(4-aminophenyl)cyclohexane, 1,1-bis(2-methyl-4-aminophenyl)cyclohexane, 1,1-bis(2,6-dimethyl-4-aminophenyl)cyclohexane, 1,1-bis(4-aminophenyl)-4-methylcyclohexane, 1,1-bis(4-aminophenyl)norbornane, 1,1-bis(2-methyl-4-aminophenyl)norbornane, 1,1-bis(2,6-dimethyl-4-aminophenyl)norbornane, 1,1-bis(4-aminophenyl)adamantane, 1,1-bis(2-methyl-4-aminophenyl)adamantane, and 1,1-bis(2,6-dimethyl-4-aminophenyl)adamantane.

Examples of the aliphatic diamine include ethylenediamine, hexamethylenediamine, polyethylene glycol bis(3-aminopropyl) ether, polypropylene glycol bis(3-aminopropyl) ether, 1,3-bis(aminomethyl)cyclohexane, 1,4-bis(aminomethyl)cyclohexane, m-xylylenediamine, p-xylylenediamine, 1,4-bis(2-aminoisopropyl)benzene, 1,3-bis(2-aminoisopropyl)benzene, isophoronediamine, norbornanediamine, siloxanediamine, 4,4'-diaminodicyclohexylmethane, 3,3'-dimethyl-4,4'-diaminodicyclohexylmethane, 3,3'-diethyl-4,4'-diaminodicyclohexylmethane, 3,3',5,5'-tetramethyl-4,4'-diaminodicyclohexylmethane, 2,3-bis(aminomethyl)-bicyclo[2.2.1]heptane, 2,5-bis(aminomethyl)-bicyclo[2.2.1]heptane, 2,6-bis(aminomethyl)-bicyclo[2.2.1]heptane, 2,2-bis(4,4'-diaminocyclohexyl)propane, and 2,2-bis(4,4'-diaminomethylcyclohexyl)propane.

Examples of the diisocyanate as the derivative of the diamine include a diisocyanate obtained through reaction of the aforementioned aromatic or aliphatic diamine and phosgene.

Examples of the diaminodisilane compound as the derivative of the diamine include a trimethylsilylated aromatic or aliphatic diamine obtained through reaction of the aforementioned aromatic or aliphatic diamine and chlorotrimethylsilane.

The diamine or a derivative thereof may be used after arbitrarily mixing, and the amount of the diamine therein is preferably from 50 to 100% by mol, and more preferably from 80 to 100% by mol.

The reaction solvent (organic solvent) used in the synthesis of the polyimide resin may be a solvent capable of dissolving the polyimide resin, and examples thereof that can be used include N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, m-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, 1,4-dioxane, ε-caprolactam, dichloromethane, and chloroform, which may be used as a combination of two or more kinds thereof. In consideration of the capability (such as the long-term storage stability where the solubility of the polyimide resin is retained to prevent an insoluble component from being formed) of the polyimide resin solution (polyimide resin varnish), N-methyl-2-pyrrolidone, N,N-dimethylacetamide, and γ-butyrolactone are preferably used alone or as a mixture thereof, and at least one of N,N-dimethylacetamide and γ-butyrolactone is more preferably used. In particular, the use of γ-butyrolactone is preferred since the temperature in the imidization can be increased.

In combination with the solvent, a poor solvent, such as hexane, heptane, benzene, toluene, xylene, chlorobenzene, and o-dichlorobenzene, may be used in such an extent that the polyimide resin is not deposited.

The catalyst used in the preparation of the polyimide resin is preferably a tertiary amine. Examples of the tertiary amine include a trialkylamine, such as trimethylamine, triethylamine, tripropylamine, and tributylamine; an alcoholamine, such as triethanolamine, N,N-dimethylethanolamine, and N,N-diethylethanolamine; a diamine, such as triethylenediamine; a nitrogen-containing alicyclic heterocyclic compound, such as N-methylpyrrolidine, N-ethylpyrrolidine, N-methylpiperidine, and N-ethylpiperidine; and a nitrogen-containing aromatic heterocyclic compound, such as imidazole, pyridine, quinoline, and isoquinoline. Among these tertiary amines, a trialkylamine is preferred, and triethylamine is more preferred.

The solvent contained in the polyimide resin composition according to the present invention may contain an organic solvent that is additionally added for controlling to a desired solid concentration, in addition to the aforementioned reaction solvent used in the synthesis of the polyimide resin.

The solvent contained in the polyimide resin composition preferably contains at least one selected from N,N-dimethylacetamide and γ-butyrolactone, and more preferably contains both N,N-dimethylacetamide and γ-butyrolactone. In the case where the polyimide resin composition contains these solvents, there may be a tendency that the increase of YI when the polyimide resin composition of the present invention is dried in air at 180° C. or more is suppressed. This is particularly effective in the case where 1,4-bis(4-amino-α,α-dimethylbenzyl)benzene and 4,4'-bis(4-aminophenoxy)biphenyl are used as the diamine component, and 1,2,4,5-cyclohexanetetracarboxylic dianhydride is used as the alicyclic tetracarboxylic acid component, as described later.

The mixing mass ratio of N,N-dimethylacetamide and γ-butyrolactone (N,N-dimethylacetamide/γ-butyrolactone) in the solvent up to the drying in the drying step according to the present invention is preferably from 90/10 to 10/90, more preferably from 70/30 to 30/70, and further preferably from 2/1. In the case where the mixing mass ratio is in the range, the deterioration of YI can be suppressed even under a high temperature.

The concentration of the polyimide resin in the polyimide resin composition is preferably from 1 to 50% by mass, and more preferably from 10 to 40% by mass. When the concentration is 50% by mass or less, the resulting polyimide resin film may have good surface flatness.

The polyimide resin composition may contain a surfactant, such as a fluorine series and a polysiloxane series. The surfactant contained may facilitate the production of a film having good surface flatness. The surfactant used may be a commercially available product, and examples of the fluorine-based surfactant include Megaface (registered trade mark) series, available from DIC Corporation, and Ftergent (registered trade mark) 251, 212MH, 250, 222F, 212D, and FTX-218, which are Ftergent series, available from NEOS Co., Ltd. Examples of the polysiloxane-based surfactant include BYK-307, BYK-315, BYK-320, BYK-325, BYK-330, BYK-331, BYK-332, BYK-333, and BYK-344, available from BYK-Chemie Japan K.K.

In the present invention, the polyimide resin composition may contain a sulfur-based antioxidant and/or a phosphorus-based antioxidant, and in the case where the antioxidants are contained, the total content of the sulfur-based antioxidant and/or the phosphorus-based antioxidant is preferably 10 parts by mass or less, more preferably 3 parts by mass or less, and further preferably 1 part by mass or less, per 100 parts by mass of the polyimide resin. When the content is 10 parts by mass or less, the YI of the film can be decreased.

Examples of the sulfur-based antioxidant include SUMILIZER TPL-R, Sumilizer TPM, Sumilizer TPS, Sumilizer TP-D, and Sumilizer MB (all produced by Sumitomo Chemical Co., Ltd.), and AO-412S and AO-503 (all produced by ADEKA Corporation).

Examples of the phosphorus-based antioxidant include Songnox 1680, ditto 1680F, and ditto 6260 (all produced by Songwon Industrial Co., Ltd.), PEP-8, PEP-36A, HP-10, 2112, and 2112RG (all produced by ADEKA Corporation), and Irgafos 168 (produced by BASF AG).

The substrate, on which the polyimide resin composition is coated in the coating step, is preferably a metal plate, such as a stainless steel and aluminum, a glass plate, or a PET substrate. The coating method that can be used may be such methods as die coating, gravure coating, spin coating, and ink-jet coating. A cast method coated using a glass bar or the like may also be used.

(Primarily Dried Film Producing Step)

In the present invention, drying is performed after coating, by the drying step described later, and as a preceding step thereof, a primarily dried film is preferably produced. In other words, a primarily dried film producing step is preferably provided between the coating step and the drying step. In the primarily dried film producing step, the coated film formed in the coating step is preferably heated to a temperature that is lower than the drying temperature in the drying step, so as to provide a primarily dried film having a self-supporting capability. Accordingly, the drying in the subsequent drying step can be efficiently performed. The condition for the production of the primarily dried film is preferably a heating temperature of 50 to 110° C. and a heating time of 30 to 90 minutes. The heating may be performed in any of air or a nitrogen atmosphere, and is preferably performed in air. The heating means is not particularly limited, and a known apparatus, such as a hot air dryer and a hot plate, may be used.

(Drying Step)

In the drying step, the coated film obtained in the coating step, preferably the primarily dried film, is dried in air at 180° C. or more. By drying the film at 180° C. or more, the residual solvent amount of the polyimide resin film can be 1.5% or less. With the residual solvent amount of the polyimide resin film of 1.5% or less, the occurrence of outgassing in the subsequent step can be suppressed.

The drying temperature is preferably from 190 to 300° C., more preferably from 200 to 270° C., and further preferably from 230 to 270° C.

The drying time is preferably from 0.5 to 5 hours, and more preferably from 2 to 4 hours, from the standpoint of the residual solvent amount and the cost and productivity.

By drying in air, the production cost can be suppressed from the case using a nitrogen atmosphere, and thus the productivity can be enhanced.

In the present invention, the term "in air" means an atmosphere that is not particularly controlled in atmosphere to a nitrogen atmosphere or the like.

Examples of the drying means include a hot air dryer and an IR heater. A hot air dryer is preferably used from the standpoint of the drying efficiency.

In the drying, it suffices that the highest drying temperature is the aforementioned temperature (i.e., 180° C. or more), and the drying may be performed by plural stages.

By performing the coating step and the drying step described above, a polyimide resin film having low yellow index (YI) and high transparency can be obtained with high productivity at low cost.

The YI of the polyimide resin film produced by the production method of the present invention is preferably 10 or less, and more preferably 4 or less, at a film thickness of 70 μm. The total light transmittance thereof is, for example, preferably 85% or more, and more preferably 89% or more, at a thickness of 80 μm. The haze thereof is preferably 8 or less, and more preferably 1 or less.

The YI, the haze, and the total light transmittance of the polyimide resin film may be measured by the methods described in the examples later.

[Polyimide Resin Film]

The polyimide resin film of the present invention is composed of a dried product of a polyimide resin composition containing a polyimide resin and a phenol-based antioxidant, and has a residual solvent amount of 3.0% by mass or less.

The term "dried product" means, for example, a product which is obtained by drying according to the method for producing a polyimide resin film of the present invention and has a residual solvent amount of 3.0% by mass or less.

In the case where the residual solvent amount exceeds 3.0% by mass, outgassing may occur in the subsequent step. The residual solvent amount is preferably 1.5% by mass or less, and more preferably 1.0% by mass or less.

The residual solvent amount may be measured by the methods described in the examples later.

The content of the phenol-based antioxidant in the polyimide resin composition is preferably 0.05 part by mass or more, more preferably from 0.05 to 10 parts by mass, further preferably from 0.1 to 3 parts by mass, and particularly preferably from 0.1 to 1 part by mass, per 100 parts by mass of the polyimide resin. When the content thereof is 0.05 part by mass or more, the YI of the film may be decreased.

The polyimide resin film of the present invention can be produced by the method for producing a polyimide resin film of the present invention.

The yellow index (YI) of the polyimide resin film of the present invention is preferably 10 or less, and more preferably 4 or less, at a film thickness of 70 μm. The total light transmittance thereof is, for example, preferably 85% or more, and more preferably 89% or more, at a thickness of 80 μm. The haze thereof is preferably 8 or less, and more preferably 1 or less.

The polyimide resin film produced by the production method of the present invention or the polyimide resin film of the present invention can be favorably used as a film for various components including a color filter, a flexible display, a semiconductor component, optical component, and the like.

The polyimide resin film produced by the production method of the present invention or the polyimide resin film of the present invention may be a single film as self-standing film in some cases, and may be a layer as a part of a laminated material in some cases.

The polyimide resin film produced by the production method of the present invention or the polyimide resin film of the present invention preferably has a thickness of from 10 to 100 μm, and more preferably from 30 to 80 μm.

EXAMPLES

The present invention will be described specifically with reference to examples below. However, the present invention is not limited to the examples.

The measurement methods for the properties of the polyimide resin films obtained in the following examples are shown below.

(1) Total Light Transmittance, YI (Yellow Index) Value, and Haze

The total light transmittance, the YI value, and the haze were measured according to JIS K7105 with a haze meter (Z-Σ80, produced by Nippon Denshoku Industries Co., Ltd.).

(2) Residual Solvent Amount (Solvent Residual Rate)

A specimen was heated from room temperature to 300° C. in a nitrogen atmosphere under condition of a temperature increasing rate of 15° C./min, and retained at 300° C. for 30 minutes, with a thermogravimetric analyzer (DTG-50, produced by Shimadzu Corporation). The total mass that was reduced during the period where the temperature was increased from 150° C. to 300° C. and during the period where the temperature was retained at 300° C. for 30 minutes was divided by the initial mass of the specimen, and the resulting value was designated as the solvent residual rate.

[Synthesis of Alicyclic Polyimide Resin]

In a 300 mL five-neck round-bottom flask equipped with a stainless steel half-moon impeller, a nitrogen introducing tube, a Dean-Stark apparatus having a condenser tube, a thermometer, and a glass end cap, 12.65 g (0.037 mol) of 1,4-bis(4-amino-α,α-dimethylbenzyl)benzene (produced by Mitsui Fine Chemicals, Inc.) and 13.53 g (0.037 mol) of 4,4'-bis(4-aminophenoxy)biphenyl (produced by Wakayama Seika Kogyo Co., Ltd.) as a diamine component, 51.18 g of γ-butyrolactone (produced by Mitsubishi Chemical Corporation) as an organic solvent, and 0.372 g of triethylamine (produced by Kanto Chemical Co., Inc.) as an imidization catalyst were charged, and stirred at a temperature in the system of 70° C. in a nitrogen atmosphere at a rotation number of 200 rpm to provide a solution.

To the solution, 16.47 g (0.07 mol) of 1,2,4,5-cyclohexanetetracarboxylic dianhydride (produced by Mitsubishi Gas Chemical Co., Inc.) as an alicyclic tetracarboxylic acid component and 12.79 g of N,N-dimethylacetamide (produced by Mitsubishi Gas Chemical Co., Inc.) as an organic solvent were added at one time, and then the mixture was heated with a mantle heater to increase the temperature in the reaction system to 190° C. over approximately 20 minutes. The temperature in the reaction system was retained to 190° C., and the reaction mixture was refluxed for 5 hours while the component that was distilled away was collected, and the rotation number was controlled according to the increase of the viscosity.

Thereafter, 95.95 g of N,N-dimethylacetamide (produced by Mitsubishi Gas Chemical Co., Inc.) was added thereto, and after cooling the temperature in the reaction system to 120° C., the reaction mixture was further stirred for 3 hours for homogenization, so as to provide a polyimide resin solution having a solid content concentration of 20% by mass.

Subsequently, the resulting polyimide resin solution was coated on a glass plate, and the solvent was evaporated by retaining to 100° C. with a hot plate for 60 minutes, so as to provide a colorless transparent primarily dried film having a self-supporting capability. The film was fixed to a stainless steel frame, and the solvent was evaporated by heating to 250° C. in a hot air dryer for 2 hours, so as to provide a film having a thickness of 30 μm.

The resulting film was subjected to FT-IR analysis (equipment name: Spectrum 100, produced by PerkinElmer, Inc.) to confirm the disappearance of the raw material peaks and the appearance of the peaks derived from the imide skeleton. The film had a refractive index nD of 1.619 and a glass transition temperature of 303° C.

The refractive index nD of the film was measured with a refractive index measuring device, produced by Atago Co., Ltd. (DR-M2) with an interference filter of 589 nm at 23° C. The glass transition temperature thereof was measured with a differential thermal analyser, produced by SII NanoTechnology, Inc. (model number: DSC-6220) in a nitrogen atmosphere under heating to 400° C. at 10° C./min.

Polyimide resin films were produced according to Examples and Comparative Examples described later by using the thus produced polyimide resin solution (solid content: 20% by mass).

The antioxidants used were as follows.

Phenol-based antioxidant (a1): Sumilizer GP (produced by Sumitomo Chemical Co., Ltd.)

Phenol-based antioxidant (a2): Adeka Stab AO-60 (produced by Adeka Corporation)

Phenol-based antioxidant (a3): Adeka Stab AO-80 (produced by Adeka Corporation)

Phenol-based antioxidant (a4): Sumilizer GA-80 (produced by Sumitomo Chemical Co., Ltd.)

Phenol-based antioxidant (a5): Songnox 1010 (produced by Songwon Industrial Co., Ltd.)

Phosphorus-based antioxidant (b1): Songnox 1680 (produced by Songwon Industrial Co., Ltd.)

Phosphorus-based antioxidant (b2): PEP-36A (produced by Adeka Corporation)

Sulfur-based antioxidant (c1): Sumilizer TP-D (produced by Sumitomo Chemical Co., Ltd.)

Example 1

20 g of the polyimide resin solution (solid content: 20% by mass) produced above and 0.012 g of the phenol-based antioxidant (a1) (0.3 part by mass per 100 parts by mass of the polyimide resin) were kneaded with T.K. Homodisper Model 2.5 (produced by Primix Corporation) at a rotation number of 2,000 rpm for 5 minutes, so as to provide a polyimide resin composition.

Subsequently, the resulting polyimide resin composition was coated on a glass plate with a glass bar, and dried with a hot air dryer in a stepwise manner at 60° C. for 30 minutes and 100° C. for 60 minutes, so as to provide a primarily dried film having a self-supporting capability. The film was fixed to a stainless steel frame, and the solvent was evaporated by heating to 200° C. in a hot air dryer for 3 hours, so as to provide a polyimide resin film having a thickness of 63 µm. The residual solvent amount, the total light transmittance, the haze value, and the YI value of the polyimide resin film were measured in the manner described above. The results are shown in Table 1.

Example 2

A polyimide resin composition was obtained in the same manner as in Example 1 except that 0.004 g of the phenol-based antioxidant (a2) (0.1 part by mass per 100 parts by mass of the polyimide resin) was used instead of the phenol-based antioxidant (a1). A polyimide resin film having a thickness of 56 m was obtained from the resulting polyimide resin composition in the same manner as in Example 1, and the residual solvent amount, the total light transmittance, the haze value, and the YI value of the polyimide resin film were measured by the aforementioned manners. The results are shown in Table 1.

Example 3

A polyimide resin composition was obtained in the same manner as in Example 1 except that 0.004 g of the phenol-based antioxidant (a3) (0.1 part by mass per 100 parts by mass of the polyimide resin) was used instead of the phenol-based antioxidant (a1). A polyimide resin film having a thickness of 56 m was obtained from the resulting polyimide resin composition in the same manner as in Example 1, and the residual solvent amount, the total light transmittance, the haze value, and the YI value of the polyimide resin film were measured by the aforementioned manners. The results are shown in Table 1.

Example 4

A polyimide resin composition was obtained in the same manner as in Example 1 except that 0.012 g of the phenol-based antioxidant (a4) (0.3 part by mass per 100 parts by mass of the polyimide resin) was used instead of the phenol-based antioxidant (a1). A polyimide resin film having a thickness of 64 µm was obtained from the resulting polyimide resin composition in the same manner as in Example 1, and the residual solvent amount, the total light transmittance, the haze value, and the YI value of the polyimide resin film were measured by the aforementioned manners. The results are shown in Table 1.

Example 5

A polyimide resin composition was obtained in the same manner as in Example 1 except that 0.012 g of the phenol-based antioxidant (a1) (0.3 part by mass per 100 parts by mass of the polyimide resin) and 0.012 g of the phenol-based antioxidant (a4) (0.3 part by mass per 100 parts by mass of the polyimide resin) were used instead of the phenol-based antioxidant (a1). A polyimide resin film having a thickness of 63 µm was obtained from the resulting polyimide resin composition in the same manner as in Example 1, and the residual solvent amount, the total light transmittance, the haze value, and the YI value of the polyimide resin film were measured by the aforementioned manners. The results are shown in Table 1.

Comparative Example 1

A polyimide resin composition was obtained in the same manner as in Example 1 except that the phenol-based antioxidant (a1) was not added. A polyimide resin film having a thickness of 70 µm was obtained from the resulting polyimide resin composition in the same manner as in Example 1, and the residual solvent amount, the total light transmittance, the haze value, and the YI value of the polyimide resin film were measured by the aforementioned manners. The results are shown in Table 1.

Example 6

A polyimide resin composition was obtained in the same manner as in Example 1 except that the temperature in the hot air dryer after the production of the primarily dried film was changed from 200° C. to 250° C. A polyimide resin film having a thickness of 73 µm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 7

A polyimide resin composition was obtained in the same manner as in Example 1 except that the amount of the phenol-based antioxidant (a1) added was changed from 0.3 part by mass to 0.6 part by mass, and the temperature in the hot air dryer after the production of the primarily dried film was changed from 200° C. to 250° C. A polyimide resin film having a thickness of 60 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 8

A polyimide resin composition was obtained in the same manner as in Example 1 except that 0.004 g of the phenol-based antioxidant (a3) (0.1 part by mass per 100 parts by mass of the polyimide resin) was used instead of the phenol-based antioxidant (a1), and the temperature in the hot air dryer after the production of the primarily dried film was changed from 200° C. to 250° C. A polyimide resin film having a thickness of 70 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 9

A polyimide resin composition was obtained in the same manner as in Example 1 except that 0.012 g of the phenol-based antioxidant (a4) (0.3 part by mass per 100 parts by mass of the polyimide resin) was used instead of the phenol-based antioxidant (a1), and the temperature in the hot air dryer after the production of the primarily dried film was changed from 200° C. to 250° C. A polyimide resin film having a thickness of 80 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 10

A polyimide resin composition was obtained in the same manner as in Example 1 except that 0.024 g of the phenol-based antioxidant (a4) (0.6 part by mass per 100 parts by mass of the polyimide resin) was used instead of the phenol-based antioxidant (a1), and the temperature in the hot air dryer after the production of the primarily dried film was changed from 200° C. to 250° C. A polyimide resin film having a thickness of 66 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 11

A polyimide resin composition was obtained in the same manner as in Example 1 except that 0.006 g of the phenol-based antioxidant (a5) (0.15 part by mass per 100 parts by mass of the polyimide resin) and 0.006 g of the phosphorus-based antioxidant (b1) (0.15 part by mass per 100 parts by mass of the polyimide resin) were used instead of the phenol-based antioxidant (a1), and the temperature in the hot air dryer after the production of the primarily dried film was changed from 200° C. to 250° C. A polyimide resin film having a thickness of 76 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 12

A polyimide resin composition was obtained in the same manner as in Example 1 except that 0.006 g of the phenol-based antioxidant (a1) (0.15 part by mass per 100 parts by mass of the polyimide resin) and 0.006 g of the phenol-based antioxidant (a4) (0.15 part by mass per 100 parts by mass of the polyimide resin) were used instead of the phenol-based antioxidant (a1), and the temperature in the hot air dryer after the production of the primarily dried film was changed from 200° C. to 250° C. A polyimide resin film having a thickness of 65 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 13

A polyimide resin composition was obtained in the same manner as in Example 1 except that 0.012 g of the phenol-based antioxidant (a1) (0.3 part by mass per 100 parts by mass of the polyimide resin) and 0.012 g of the phenol-based antioxidant (a4) (0.3 part by mass per 100 parts by mass of the polyimide resin) were used instead of the phenol-based antioxidant (a1), and the temperature in the hot air dryer after the production of the primarily dried film was changed from 200° C. to 250° C. A polyimide resin film having a thickness of 55 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 14

A polyimide resin composition was obtained in the same manner as in Example 1 except that 0.002 g of the phenol-based antioxidant (a3) (0.05 part by mass per 100 parts by mass of the polyimide resin) and 0.002 g of the phosphorus-based antioxidant (b2) (0.05 part by mass per 100 parts by mass of the polyimide resin) were used instead of the phenol-based antioxidant (a1), and the temperature in the hot air dryer after the production of the primarily dried film was changed from 200° C. to 250° C. A polyimide resin film having a thickness of 64 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Example 15

A polyimide resin composition was obtained in the same manner as in Example 1 except that 0.006 g of the phenol-based antioxidant (a4) (0.15 part by mass per 100 parts by mass of the polyimide resin) and 0.006 g of the sulfur-based antioxidant (c1) (0.15 part by mass per 100 parts by mass of the polyimide resin) were used instead of the phenol-based antioxidant (a1), and the temperature in the hot air dryer after the production of the primarily dried film was changed from 200° C. to 250° C. A polyimide resin film having a thickness of 78 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Comparative Example 2

A polyimide resin composition was obtained in the same manner as in Example 1 except that the phenol-based antioxidant (a1) was not added, and the temperature in the hot air dryer after the production of the primarily dried film was changed from 200° C. to 250° C. A polyimide resin film having a thickness of 79 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

Comparative Example 3

A polyimide resin composition was obtained in the same manner as in Example 1 except that 0.004 g of the phosphorus-based antioxidant (b2) (0.1 part by mass per 100 parts by mass of the polyimide resin) was used instead of the phenol-based antioxidant (a1), and the temperature in the hot air dryer after the production of the primarily dried film was changed from 200° C. to 250° C. A polyimide resin film having a thickness of 70 μm was obtained from the resulting polyimide resin composition in the same manner as in Example 1, and the residual solvent amount, the total light transmittance, the haze value, and the YI value of the polyimide resin film were measured by the aforementioned manners. The results are shown in Table 2.

TABLE 1

|  | Example 1 | Example 2 | Example 3 | Example 4 | Example 5 | Comparative Example 1 |
|---|---|---|---|---|---|---|
| Drying temperature (° C.) | 200 | 200 | 200 | 200 | 200 | 200 |
| Kind of antioxidant: Amount added (part by mass) | (a1): 0.3 | (a2): 0.1 | (a3): 0.1 | (a4): 0.3 | (a1): 0.3 (a4): 0.3 | — |
| Film thickness (μm) | 63 | 56 | 56 | 64 | 63 | 70 |
| Residual solvent amount (% by mass) | 1.4 | 1.3 | 1.4 | 1.4 | 1.5 | 1.4 |
| YI | 2 | 2.1 | 2.1 | 2.5 | 2 | 2.7 |
| Haze | 1.1 | 0.6 | 0.4 | 0.4 | 0.3 | 0.2 |
| Total light transmittance (%) | 89.6 | 89.6 | 89.2 | 89.5 | 89.7 | 89.5 |

TABLE 2

|  | Example 6 | Example 7 | Example 8 | Example 9 | Example 10 | Example 11 |
|---|---|---|---|---|---|---|
| Drying temperature (° C.) | 250 | 250 | 250 | 250 | 250 | 250 |
| Kind of antioxidant: Amount added (part by mass) | (a1): 0.3 | (a1): 0.6 | (a3): 0.1 | (a4): 0.3 | (a4): 0.6 | (a5): 0.15 (b1): 0.15 |
| Film thickness (μm) | 73 | 60 | 70 | 80 | 66 | 76 |
| Residual solvent amount (% by mass) | 0.4 | 0.5 | 0.1 | 0.1 | 0.3 | 0.7 |
| YI | 7.2 | 4.4 | 6.6 | 7.6 | 6.2 | 5.4 |
| Haze | 0.6 | 0.4 | 0.4 | 0.3 | 0.2 | 0.4 |
| Total light transmittance (%) | 88.7 | 89.3 | 89 | 88.6 | 88.8 | 88.9 |

|  | Example 12 | Example 13 | Example 14 | Example 15 | Comparative Example 2 | Comparative Example 3 |
|---|---|---|---|---|---|---|
| Drying temperature (° C.) | 250 | 250 | 250 | 250 | 250 | 250 |
| Kind of antioxidant: Amount added (part by mass) | (a1): 0.15 (a4): 0.15 | (a1): 0.3 (a4): 0.3 | (a3): 0.05 (b2): 0.05 | (a4): 0.15 (c1): 0.15 | — | (b2): 0.1 |

TABLE 2-continued

| | | | | | | |
|---|---|---|---|---|---|---|
| Film thickness (μm) | 65 | 55 | 64 | 78 | 79 | 70 |
| Residual solvent amount (% by mass) | 0.2 | 0.5 | 0.1 | 0.7 | 0.2 | 0.4 |
| YI | 7.8 | 6 | 6.5 | 4.1 | 13.7 | 18.4 |
| Haze | 0.2 | 0.5 | 0.3 | 7.1 | 2.6 | 0.7 |
| Total light transmittance (%) | 88.4 | 89.1 | 89.1 | 91.1 | 82.4 | 85.3 |

As shown in Table 1, the films of Examples 1 to 5 and Comparative Example 1, in which the drying temperature was 200° C., were almost equivalent to each other in the evaluation result of the total light transmittance. The films of Examples 1 to 5 had somewhat lower YI than the film of Comparative Example 1.

It is considered from the results that the polyimide resin used is not severely oxidized even when dried in air at 200° C. It is considered therefore that the film having no antioxidant added thereto (Comparative Example 1) shows good results in YI and total light transmittance, and the improvement in YI and total light transmittance is limited even in the case where the antioxidant is added to the same polyimide resin (Examples 1 to 5). In Examples 1 to 5, however, YI and decrease of total light transmittance due to the presence of the antioxidant itself in the film was not observed as a result of the use of the phenol-based antioxidant as the antioxidant.

It was understood from the comparison of Table 2 to Table 1 that the films of Examples 6 to 15 and Comparative Examples 2 and 3, in which the drying temperature was 250° C., had smaller residual solvent amounts than the films of Examples 1 to 5 and Comparative Example 1, in which the drying temperature was 200° C. Therefore, it can be said that the films of Examples 6 to 15 and Comparative Example 2 are better from the standpoint of the suppression of the occurrence of outgassing.

However, irrespective of the fact that the film production method in Comparative Example 2 was different only in the drying temperature from the film production method in Comparative Example 1, and the same polyimide resin was used therein, the film of Comparative Example 2 was significantly inferior in the evaluation results of YI and total light transmittance (i.e., the YI was a significantly high value, and the total light transmittance was a significantly low value). It is considered that this is because the oxidation of the polyimide resin proceeds under the drying condition in air at 250° C. However, even under the drying condition in air at 250° C., the case where the phenol-based antioxidant was added to the same polyimide resin (Examples 6 to 15) showed good values in YI and total light transmittance, which indicated the significant improvement obtained by the addition of the antioxidant. Under the drying condition in air at 250° C., furthermore, in the case where only the phosphorus-based antioxidant was added to the same polyimide resin (Comparative Example 3), the YI was further deteriorated, and the total light transmittance was not largely improved.

It is considered that the polyimide resin used in Examples and Comparative Examples is not severely oxidized at 200° C., but there is a possibility that oxidation proceeds at 200° C. depending on the kind of the polyimide resin used. Even for the polyimide resin of that kind, it is expected that the YI and the total light transmittance of the film can be retained to good values by adding the phenol-based antioxidant.

The invention claimed is:

1. A method for producing a polyimide resin film, consisting of:
    forming a coated film by coating a polyimide resin composition containing a polyimide resin, an antioxidant, and a solvent on a substrate; heating the coated film at a heating temperature of 50° C. to 110° C. for a heating period of 30 to 90 minutes to obtain a primarily dried film; and drying the primarily dried film in air at a temperature of from 230° C. to 300° C. to obtain a residual solvent amount of 3.0% by mass or less,
    the antioxidant being a phenol-based antioxidant, and
    a content of the phenol-based antioxidant being from 0.05 part to 10 parts by mass per 100 parts by mass of the polyimide resin.

2. The method for producing a polyimide resin film according to claim 1, wherein the solvent is at least one selected from the group consisting of N,N-dimethylacetamide and γ-butyrolactone.

3. The method for producing a polyimide resin film according to claim 1, wherein the polyimide resin composition contains a sulfur-based antioxidant and/or a phosphorus-based antioxidant, and
    a total content of the sulfur-based antioxidant and/or the phosphorus-based antioxidant is 10 parts by mass or less per 100 parts by mass of the polyimide resin.

4. The method of claim 1 wherein the polyimide resin film has a yellow index of 10 or less at a film thickness of 70 μm.

5. The method of claim 1 wherein the polyimide resin film has a total light transmittance of 85% or more at a film thickness of 80 μm.

6. The method of claim 1 wherein the polyimide resin film has a haze value of 8 or less.

* * * * *